(12) United States Patent
Prescott

(10) Patent No.: US 8,195,793 B2
(45) Date of Patent: Jun. 5, 2012

(54) METHOD AND APPARATUS OF FILTERING STATISTIC, FLOW AND TRANSACTION DATA ON CLIENT/SERVER

(75) Inventor: Dan Prescott, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 299 days.

(21) Appl. No.: 12/538,663

(22) Filed: Aug. 10, 2009

(65) Prior Publication Data

US 2011/0022701 A1 Jan. 27, 2011

Related U.S. Application Data

(60) Provisional application No. 61/228,927, filed on Jul. 27, 2009.

(51) Int. Cl.
*G06F 15/173* (2006.01)
(52) U.S. Cl. .......... 709/224; 370/419; 370/252; 706/45; 704/9; 709/223
(58) Field of Classification Search .................. 709/224
See application file for complete search history.

(56) References Cited

U.S. PATENT DOCUMENTS

| 7,295,965 | B2 * | 11/2007 | Haigh et al. | 704/9 |
| 8,051,021 | B2 * | 11/2011 | Aggarwal et al. | 706/45 |
| 2005/0254435 | A1 * | 11/2005 | Moakley et al. | 370/252 |
| 2007/0160073 | A1 * | 7/2007 | Toumura et al. | 370/419 |

* cited by examiner

*Primary Examiner* — Hua Fan
(74) *Attorney, Agent, or Firm* — patenttm.us

(57) ABSTRACT

Network traffic filtering is provided to enable gathering of data and statistics related to client/server traffic corresponding to valid and desired client to server/server to client traffic.

8 Claims, 3 Drawing Sheets

METHOD AND APPARATUS OF FILTERING STATISTIC, FLOW AND TRANSACTION DATA ON CLIENT/SERVER

CROSS-REFERENCE TO RELATED APPLICATIONS

This application claims priority of U.S. provisional patent application 61/228,927, filed Jul. 27, 2009, entitled METHOD AND APPARATUS OF FILTERING STATISTIC, FLOW AND TRANSACTION DATA ON CLIENT/SERVER.

BACKGROUND OF THE INVENTION

This invention relates to networking analysis, and more particularly to filtering statistic, flow and transaction data on client/server for improved monitoring and analysis of network traffic.

In a complex computer networking environment, large amounts of traffic may be exchanged, whereas a network technician may be interested in analyzing only traffic between clients and servers, and in particular situations only between specific client/server sets.

SUMMARY OF THE INVENTION

In accordance with the invention, network traffic is observed and determination is made of client, server and protocol, and if the observed traffic is of the desired type and represents client/server traffic within a group of interest to a user, the traffic or information about the traffic is passed on for further processing or analysis.

Accordingly, it is an object of the present invention to provide an improved network analysis system for gathering client/server traffic information.

It is a further object of the present invention to provide an improved network monitoring device that enables observation of traffic of specifically desired client/server/protocols.

It is yet another object of the present invention to provide improved methods of network monitoring and analysis to provide filtering to retrieve data or statistics related to client/server/protocols of interest.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a monitoring system and method and an analysis system and method for filtering statistic, flow and transaction data on client/server criteria.

Figure 1:
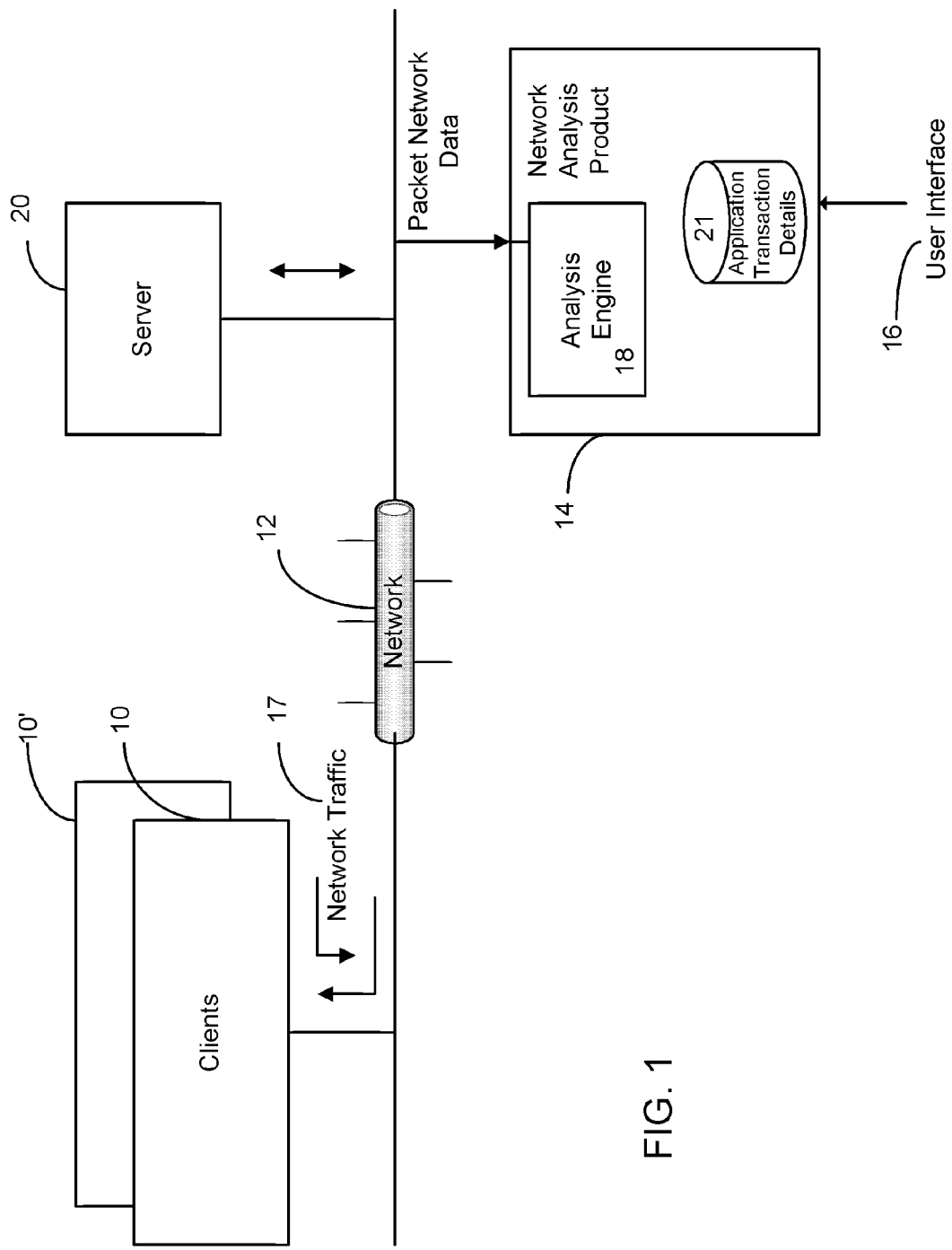
FIG. 1 is a block diagram of a network with a network analysis product interfaced therewith.

Referring to FIG. 1, a block diagram of a network with an apparatus in accordance with the disclosure herein, a network may comprise plural network devices 10, 10' which are denoted clients in this consideration, which communicate over a network 12 by sending and receiving network traffic 17, some of which is traffic between clients 10, 10' and server 20. The traffic may be sent in packet form, with varying protocols and formatting thereof.

A network analysis product 14 is also connected to the network, and may include a user interface 16 that enables a user to interact with the network analysis product to operate the analysis product and obtain data therefrom, whether at the location of installation or remotely from the physical location of the analysis product network attachment.

The network analysis product comprises hardware and software, CPU, memory, interfaces and the like to operate to connect to and monitor traffic on the network, as well as performing various testing and measurement operations, transmitting and receiving data and the like. When remote, the network analysis product typically is operated by running on a computer or workstation interfaced with the network.

The analysis product comprises an analysis engine 18 which receives the packet network data and interfaces with application transaction details data store 21.

Figure 2:
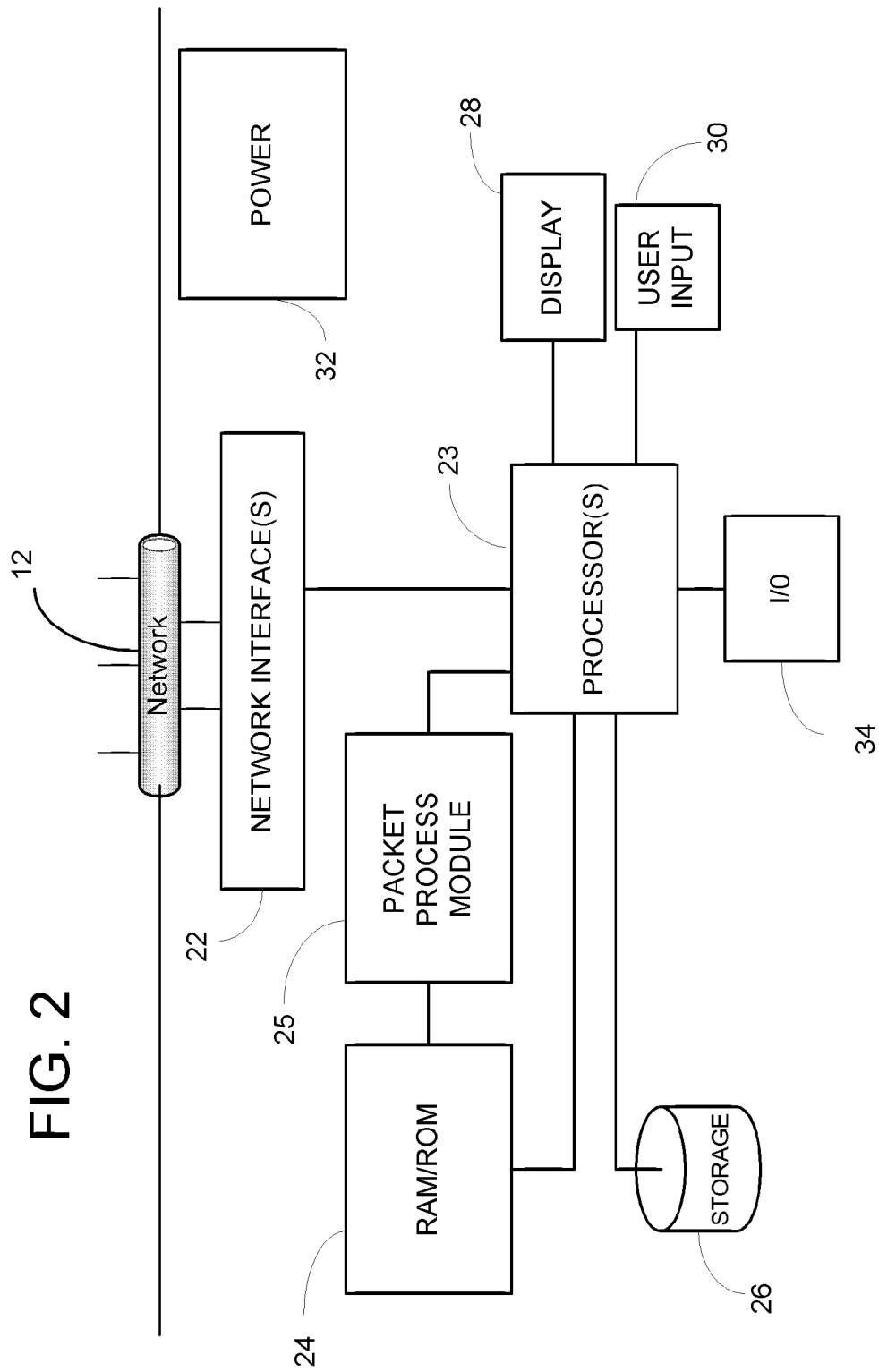
FIG. 2 is a block diagram of a monitor device for filtering client/server/protocol traffic.

FIG. 2 is a block diagram of a test instrument/analyzer 36 via which the invention can be implemented, wherein the instrument may include network interfaces 22 which attach the device to a network 12 via multiple ports, one or more processors 23 for operating the instrument, memory such as RAM/ROM 24 or persistent storage 26, display 28, user input devices 30 (such as, for example, keyboard, mouse or other pointing devices, touch screen, etc.), power supply 32 which may include battery or AC power supplies, other interface 34 which attaches the device to a network or other external devices (storage, other computer, etc.). Packet processing module 25 provides processing of packets and storage of data related thereto for use in the analysis product to assist in the filtering of statistic, flow and transaction data related to client/server traffic.

In operation, the network test instrument is attached to the network, and observes transmissions on the network to collect information and statistics thereon related to client/server traffic.

A set of filters are made based on IP addresses and/or ports, suitably ranges of IP addresses and/or ranges of ports, to select traffic that is within those IP ranges and/or port ranges.

In the particular embodiment of use it is desired only to provide information that is relevant to client/server traffic and not to include information that isn't client/server related. It is further desired to not provide information or data where the client or server falls out of a set of defined IP address ranges and/or port ranges.

Accordingly, a vast amount of traffic is observed, but information and statistical results are only desired where it is know that the traffic is client/server and only where the client and/or server is/are part of the client/server set in which the user is interested.

To process the information, there are three main step employed.

First, determining the traffic type (protocol) and which side of the transaction appears to be the client and which is the server.

Once the traffic type is known, the next step (second) is to determine if the traffic type behaves in a client/server relationship or if the traffic type behaves in a peer to peer fashion. The traffic type's relationship behavior can then be used to make a final determination which side is the client and which side is the server. Based on the known traffic type and the behavior of that traffic, which side is determined as the client and which is determined to be the server, a level of confidence determination can be applied to that specific combination of traffic.

The confidence level provides the ability to allow users to drill in to different levels of confidence, for example, allowing a user to observe all the traffic that is of type 'unknown whether client/server', 'best guess is client/server' and 'know client/server'.

Thirdly, having the observed traffic that is of a level of confidence, the client and/or server addresses of the traffic is used to look up against known clients and/or servers that the user cares about. If it fits in the traffic group that the user wants to see, then the information is passed on for further use in analysis/display/etc. Otherwise, the information is discarded or handled in some other way, so that it doesn't pollute the statistics traffic the user cares to analyze and view.

Figure 3:
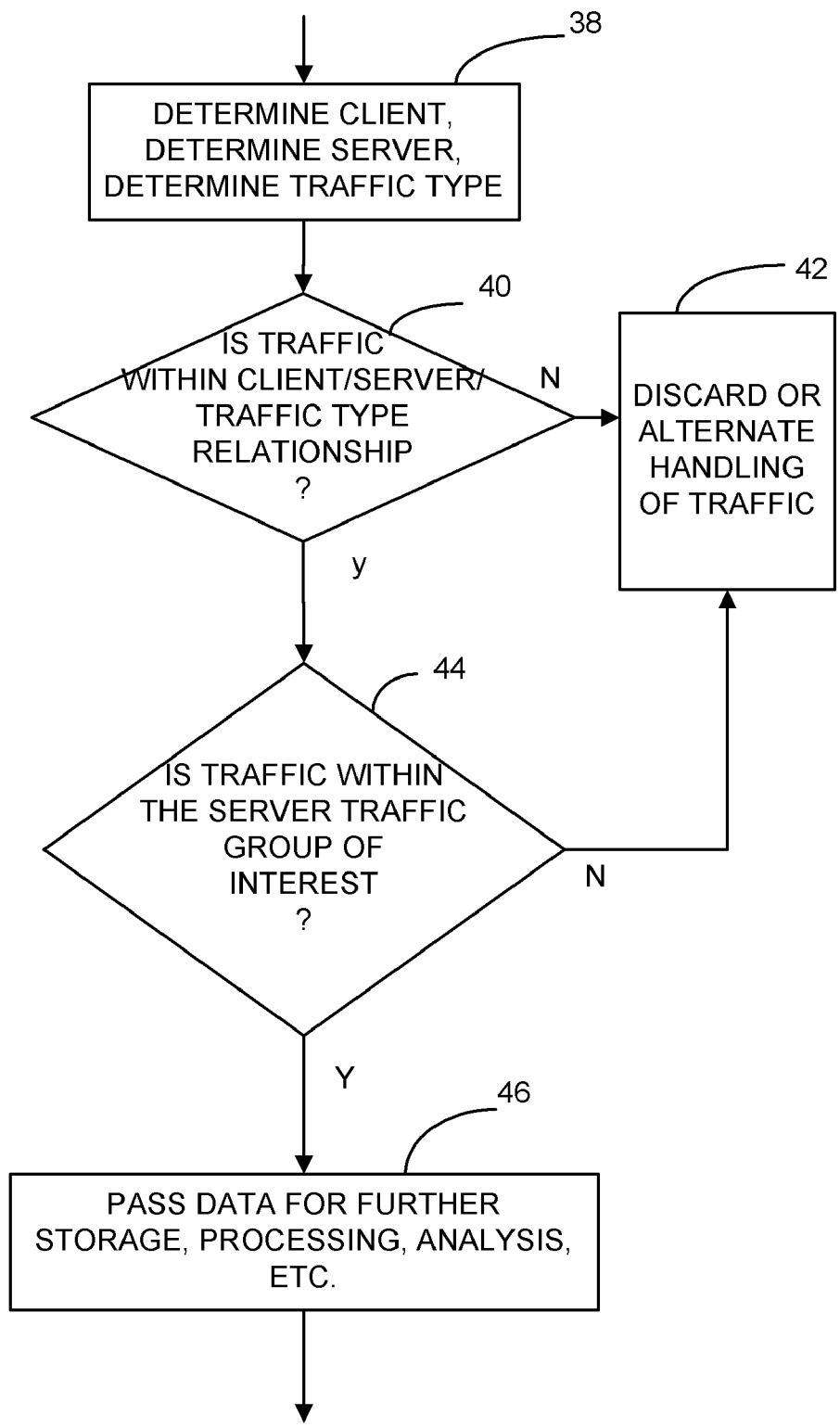
FIG. 3 is a flow chart of determination steps.

FIG. 3 is a flow chart illustrating the analysis process in analyzing observed network traffic data from real time (or from the application transaction detail data store). The analysis process is suitably performed by analysis engine 18, which may be implemented by processor(s) 23/packet processing module 25, for example. In block 38, the traffic is analyzed to determine client, server and traffic type (or protocol), that is, determining which 'side' of the traffic flow is which and the type of traffic.

Decision block 40 then determines whether the traffic is the type of traffic that would fall into the client/server type of relationship. If the determination is that the traffic is not of the type, then it is either discarded (for purposes of statistics or processing relative to client/server of interest) or handled in an alternative manner for other purposes in block 42.

In the alternative, if the decision block 40 determination of whether the traffic is the type of traffic that would fall into the client/server type of relationship is that it is of that type, then in decision block 44, a determination is made whether the traffic is within the client and/or server group of interest, by, for example, looking up the server address for this traffic against the known servers that are in the servers of interest (e.g., those specified by the user for monitoring . . . ). If the determination is that the traffic is not within the client and/or server group of interest, then it is either discarded (for purposes of statistics or processing relative to client/server of interest) or handled in an alternative manner for other purposes in block 42.

If the traffic is within the server group of interest, then the traffic data or information about the traffic is passed on (block 46) for further storage, processing, analysis, etc., to ultimately provide information to a user regarding desired client/server traffic.

In accordance with the above, the invention provides more focused information relative to client/server traffic exchanges that are of interest.

In use, an interface is provided to allow a user to easily configure a set or sets of IP addresses, IP address ranges and/or IP networks that describe the set of application clients and/or servers that are of interest for monitoring. The information the user enters is merged with a measure of confidence of the client/server determination to provide only data for application metrics that are accurate, relevant and meaningful to the user.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of filtering network transactions for analysis received over a computer network by a network test device, comprising:
    determining, by the network test device, a traffic type of a network transaction;
    determining a relationship behavior corresponding to the traffic type, the relationship behavior being a client/server relationship or a peer to peer relationship;
    determining which side of the network transaction is a client and which side is a server, based on the determined relationship behavior;
    assigning a level of confidence determination to the network transaction based on the determined traffic type, the determined relationship behavior, and the determined side of client or server, wherein levels of confidence determinations assigned to network transactions enable users to observe all traffic that is of type "unknown whether client/server", to observe all traffic that is of type "best guess is client/server," and to observe all traffic that is of type "known client/server";
    determining if the traffic type of the network transaction is a kind that falls into a type of relation of interest; and
    determining if a server address of the network transaction is in a server traffic group of interest.

2. The method according to claim 1, wherein if the server address of the network transaction is determined to be in a server traffic group of interest, passing information associated with the network transaction on for further use.

3. The method according to claim 1, wherein if the server address of the network transaction is determined to be not in a server traffic group of interest, handling information associated with the network transaction in an alternative manner.

4. The method according to claim 3, wherein said handling in an alternative manner comprises discarding the information associated with the network transaction.

5. A network test device for filtering network transactions over a computer network for analysis, comprising:
    a memory storing executable instructions that, when executed by one or more processors, perform the method of:
    determining a traffic type of a network transaction;
    determining a relationship behavior corresponding to the traffic type, the relationship behavior being a client/server relationship or a peer to peer relationship;
    determining which side of the network transaction is a client and which side is a server, based on the determined relationship behavior;
    assigning a level of confidence determination to the network transaction based on the determined traffic type, the determined relationship behavior, and the determined side of client or server, wherein levels of confidence determinations assigned to network transactions enable users to observe all traffic that is of type "unknown whether client/server", to observe all traffic that is of type "best guess is client/server," and to observe all traffic that is of type "known client/server";
    determining if the traffic type of the network transaction is a kind that falls into a type of relation of interest; and
    determining if a server address of the network transaction is in a server traffic group of interest.

6. The network test device according to claim 5, wherein if the server address of the network transaction is determined to be in the server traffic group of interest, passing the information associated with the network transaction on for further use.

7. The network test device according to claim 5, wherein if the server address of the network transaction is determined to be not in the server traffic group of interest, handling information associated with the network transaction in an alternative manner.

8. The network test device according to claim 7, wherein said handling in an alternative manner comprises discarding the information associated with the network transaction.

* * * * *